No. 684,932. Patented Oct. 22, 1901.
R. B. HARTWIG.
DISPLAY DEVICE.
(Application filed Dec. 24, 1900.)
(No Model.) 2 Sheets—Sheet 1.
Fig. I.
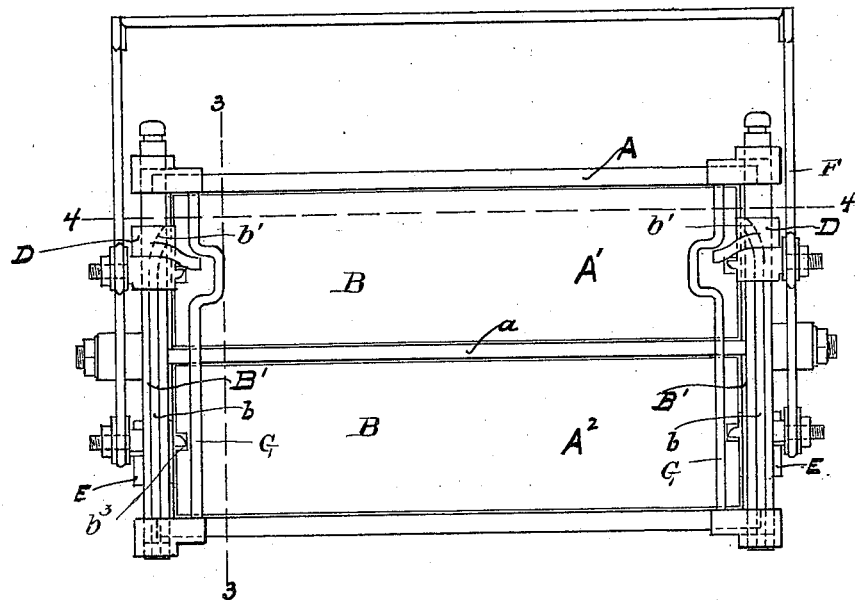
Fig. II.
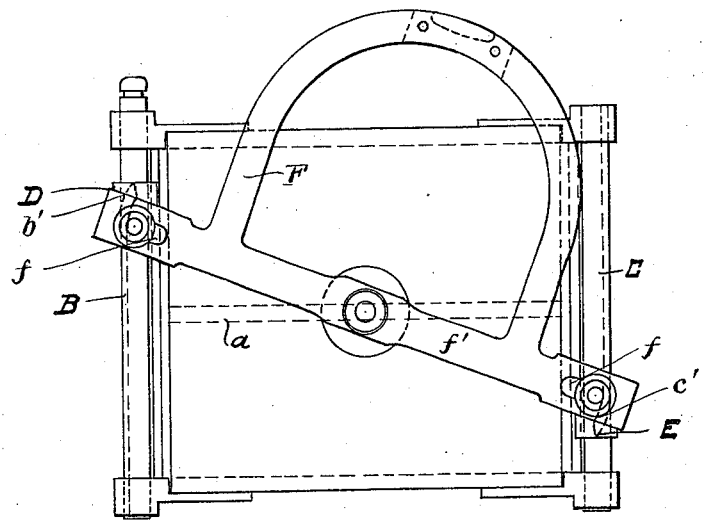
WITNESSES
D. T. Davies
N. C. Merkel.
INVENTOR
R. B. Hartwig
PER J. B. Fay
ATTORNEY No. 684,932. Patented Oct. 22, 1901.
R. B. HARTWIG.
DISPLAY DEVICE.
(Application filed Dec. 24, 1900.)
(No Model.) 2 Sheets—Sheet 2.
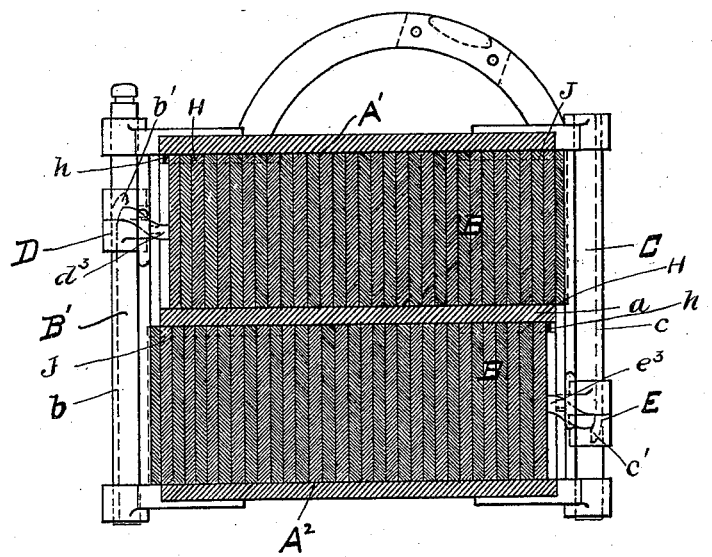
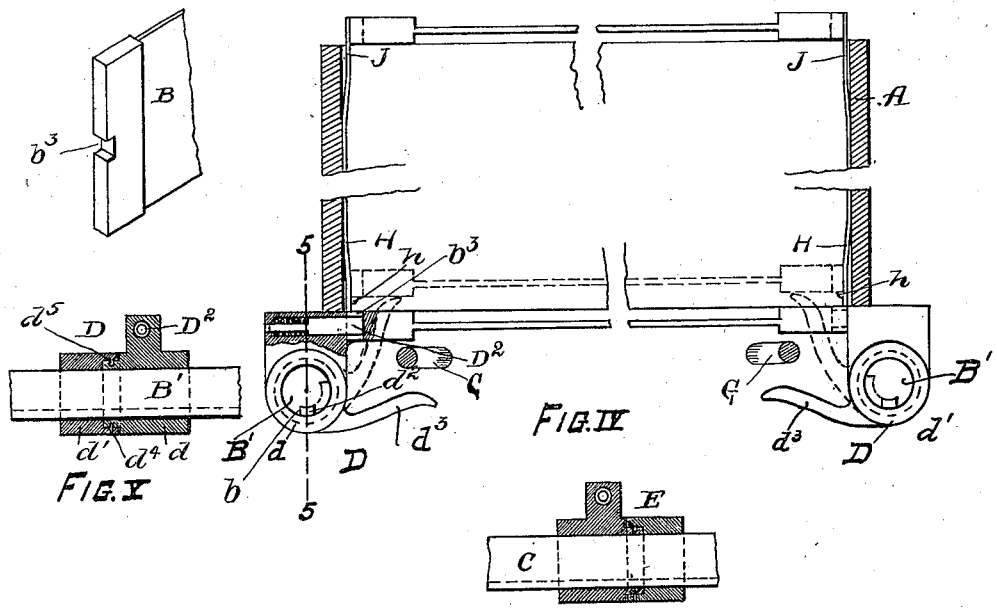
WITNESSES
D. Davies
A. E. Merkel
INVENTOR
R. B. Hartwig
PER J. B. Fay
ATTORNEY

UNITED STATES PATENT OFFICE.

RUDOLPH B. HARTWIG, OF CLEVELAND, OHIO.

DISPLAY DEVICE.

SPECIFICATION forming part of Letters Patent No. 684,932, dated October 22, 1901.

Application filed December 24, 1900. Serial No. 40,837. (No model.)

*To all whom it may concern:*

Be it known that I, RUDOLPH B. HARTWIG, a citizen of the United States, and a resident of Cleveland, county of Cuyahoga, and State of Ohio, have invented a new and useful Improvement in Display Devices, of which the following is a specification, the principle of the invention being herein explained and the best mode in which I have contemplated applying that principle, so as to distinguish it from other inventions.

My invention relates to devices for indicating in a vehicle, such as a trolley-car, the names of approaching streets; and it consists of means hereinafter fully described.

The annexed drawings and the following description set forth in detail certain means embodying the invention, such disclosed means constituting but one of various forms in which the principle of the invention may be used.

In said annexed drawings, Figure I represents a front elevation of a device embodying my invention. Fig. II represents an end view of same. Fig. III represents a transverse cross-section taken upon the plane indicated by the line 3 3, Fig. I. Fig. IV represents an enlarged detail broken cross-section taken upon the plane indicated by the line 4 4, Fig. I; Fig. V, a detail view taken upon the plane indicated by line 5 5, Fig. IV; Fig. VI, a detail section similar to that shown in Fig. V, and Fig. VII is a detail perspective.

A rectangular receptacle A is provided with a central longitudinal partition $a$, forming two parallel channels A' and A², in each of which is located a row of signs B, containing the required names of streets. Transversely of the ends of said channels and located laterally thereof are secured two pairs of guiding-posts B' and C, Figs. I and II. Each post is provided with a longitudinal groove $b$ and $c$, provided with an inwardly-extending cam portion $b'$ and $c'$, cam portions $b'$ being located at the end of their respective grooves opposite channel A', and cam portions $c'$ opposite channel A². Upon posts B' are mounted slides D, each consisting of a lower rotatively-fixed portion $d$, Fig. V, and an upper oscillating portion $d'$, provided with a spline $d^2$, which engages the grooves $b$, respectively, whereby it is seen that such slides may be oscillated by the cam portion of such grooves on the engagement of said splines therewith. Upon posts C are similarly mounted slides E, which are of a construction similar to slides D and are similarly capable of oscillation, the fixed portion being, however, located above the oscillating portion. The oscillating and fixed portions of the slides are rotatively secured to each other by means of a groove $d^4$ and stud $d^5$, formed in said two parts, respectively, as will be readily understood from Fig. V.

Slides D are slidably mounted in slots $f$, formed in front ends of two lower members $f'$ of an oscillatory frame F, and slides E are similarly mounted upon the rear ends of such frame members, as will be seen from Fig. II. Each slide is formed with a finger $d^3$ and $e^3$, which extend toward each other in pairs, as shown in Fig. IV, when the splines engage the longitudinal portion of their respective grooves. It is hence seen from the above construction that the oscillation of the frame F may be caused to effect the reciprocation of one part of the slides upon their guides in one direction, simultaneously reciprocate the other pair upon its guides in the opposite direction, and oscillate one pair of the fingers at and toward one end of one channel and the other pair at and toward the opposite end of the other channel.

Each sign B is formed upon each of its ends with an indentation $b^3$, as shown in Fig. VII. Each lower portion $d$ of each slide is provided with a yielding spring-dog D², which is adapted to engage an indentation $b^3$ of a sign. The distance between pairs of guideposts is made such as to permit a sign to be placed between the two slides upon such guides and permit the dogs D² to simultaneously engage both indentations formed upon the lateral edges of such sign. At each side of the entrance end of each channel is placed a spring H, having a detaining-lip $h$ formed thereon, as shown in Fig. IV, such lips projecting into the path of the slides. At the opposite end of each such channel is placed on each side a spring J, projecting a short distance beyond that end of the channel, as shown in said Fig. IV.

In operating the above-described device each channel is filled with signs, laid one against the other, as shown in Fig. III, a sign being also placed in addition upon each of the two pairs of dogs D², as shown in said figure, the frame F being placed in the position in which each pair of slides occupies that end of its stroke in which the splines engage the straight portion of the grooves—that is, slides D are opposite channel A², and E are opposite channel A'. Upon the oscillation of the frame F slides D carry a sign from the end of channel A' to a position opposite channel A², and slides E carry a sign from the end of channel A² to a position opposite the end of channel A', such positions being at opposite ends of the receptacle. On reaching such positions the splines of the oscillatory parts of the slides engage the cam portion of the grooves and the fingers upon the slides are turned inwardly toward the channels, thereby sliding the two signs from the dogs which hold them into the channels contiguous to whose ends they have just been placed, as shown in dotted lines, Fig. IV. Such action moves each row of signs in opposite directions, displaces a sign from the opposite end, respectively, of the channels A' and A², and moves same into the respective paths of the pairs of dogs upon the slides, the slide displaced from the upper channel being held from dropping by the upper springs J, as shown in Fig. IV, the lower spring J holding the lower displaced sign in proper position in a similar manner. The lips h on the springs H at the opposite ends of said channels prevent the signs from being backed out after insertion into their respective channels. The return movement of the oscillation now taking place, these dogs slide upon the sides of such two displaced signs and engaging the indentations engage and secure a second pair of signs.

Upright retaining-rods G are provided at each end of the device for preventing the signs from becoming displaced from such ends and forming channels running transversely of the channels A' and A² for the passage of the signs from one channel to the other. In this manner each sign is transported from one channel to the other, progressively moved along the latter, until it is finally carried and placed in the first-named channel, along which it then progresses in the opposite direction.

Suitable means are provided for oscillating the rocking frame F at proper times, such means, however, forming no part of the invention herein claimed.

Other modes of applying the principle of my invention may be employed instead of the one explained, change being made as regards the means herein disclosed, provided the means stated by any one of the following claims or the equivalent of such stated means be employed.

I therefore particularly point out and distinctly claim as my invention—

1. In a display device, the combination of an oscillatory frame, two pairs of guides, two pairs of slides mounted in such frame and slidably mounted upon said guides whereby such pairs of slides may be simultaneously moved in opposite directions, and means for oscillating said slides upon the guides transversely of their direction of sliding movement.

2. In a display device, the combination of two parallel sign-channels, a pair of guides located at each end and transversely of said channels, slides mounted upon said guides, means for moving the pair of slides at one end of said channels in one direction transverse with respect thereto, and the other pair in the opposite direction, and means for oscillating one pair of said slides upon its guides so as to move toward the end of one channel and the other pair of slides so as to simultaneously move toward the opposite end of the other channel.

3. In a display device, the combination of two parallel sign-channels, two pairs of guides, one pair located at one end of one channel and the other at the opposite end of the other channel, the members of each pair located laterally of its respective channel, a slide upon each guide provided with an oscillatory portion having an extending finger, means for simultaneously moving slides upon one pair of guides in one direction, and those upon the other pair in the opposite direction, and means for oscillating the oscillatory portions of said slides at the ends of their respective strokes.

4. In a display device, the combination of a sign-channel, a pair of guides located transversely and laterally of the end of said channel, a slide mounted upon each guide provided with an extending finger, each guide provided with a cam-groove engaging its respective slide, said groove adapted to oscillate such slide so as to cause said finger to move toward said channel, and means for reciprocating said slides upon the guides.

5. In a display device, the combination of a pair of parallel sign-channels, a row of signs in each channel, two pairs of guides, one pair located at each end of such channels, an oscillatory frame, two pairs of slides mounted upon said pairs of guides respectively, each guide provided with a groove having a cam portion, such cam portion being located at opposite ends of the respective pairs of guides, each slide provided with an extending finger, engaging the groove in its corresponding guide and having means for engaging said signs, whereby the latter may be transported from one channel to the other, and said fingers caused to insert a sign at one end of a channel and eject another from the opposite end.

Signed by me this 20th day of December, 1900.

R. B. HARTWIG.

Attest:
D. T. DAVIES,
A. E. MERKEL.